(12) United States Patent
Masoud et al.

(10) Patent No.: US 10,394,153 B2
(45) Date of Patent: Aug. 27, 2019

(54) INK COMPOSITION WITH PIGMENT PARTICLES HAVING A HYDROPHOBIC SURFACE

(71) Applicant: HP Indigo B.V., Amstelveen (NL)

(72) Inventors: Emad Masoud, Nes Ziona (IL); Neta Filip-Granit, Moshav azrikam (IL); Vladislav Kaploun, Rehovot (IL); Olga Kagan, Ashdod (IL); Yelena Litichevski, Nes Ziona (IL); Albert Teishev, Rishon le-zion (IL)

(73) Assignee: HP Indigo B.V., Amselveen (NL)

( * ) Notice: Subject to any disclaimer, the term of this patent is extended or adjusted under 35 U.S.C. 154(b) by 19 days.

(21) Appl. No.: 15/534,412

(22) PCT Filed: Dec. 22, 2014

(86) PCT No.: PCT/EP2014/079068
§ 371 (c)(1),
(2) Date: Jun. 8, 2017

(87) PCT Pub. No.: WO2016/101987
PCT Pub. Date: Jun. 30, 2016

(65) Prior Publication Data
US 2018/0275548 A1    Sep. 27, 2018

(51) Int. Cl.
*G03G 9/12* (2006.01)
*C09B 67/08* (2006.01)
(Continued)

(52) U.S. Cl.
CPC ......... *G03G 9/122* (2013.01); *C09B 67/0004* (2013.01); *C09C 1/043* (2013.01);
(Continued)

(58) Field of Classification Search
CPC .................................................. G03G 9/122
See application file for complete search history.

(56) References Cited

U.S. PATENT DOCUMENTS 3,437,502 A   4/1969 Werner
5,114,990 A   5/1992 Dethlefs
(Continued)

FOREIGN PATENT DOCUMENTS

WO   WO 2007/106396   * 9/2007   ............... G03G 9/12
WO   WO-2007/106396      9/2007
(Continued)

OTHER PUBLICATIONS

Product Data Sheet for A-C 512 copyrighted 2018; file:///C:/Users/pvajda/Desktop/ZZZ-Palm%20outage%20docs/15_534412/Honeywell%20Product%20Data%20Sheet.pdf.*
(Continued)

*Primary Examiner* — Peter L Vajda
(74) *Attorney, Agent, or Firm* — HP Inc. Patent Department

(57) ABSTRACT

Provided in one example herein is a liquid electrophotographic ink composition. The composition comprises: a carrier fluid comprising a polymer; ink particles each comprising a non-aqueous polymeric resin and pigment particles distributed in the polymeric resin; and a charge director. The pigment particles comprise a metal oxide and have a hydrophobic surface. The hydrophobic surface comprises at least one of the following: (i) nanoparticles attached to each of the pigment particles, the nanoparticles comprising at least one of an oxide, a phosphate, and a nitrate; (ii) a coating disposed over each of the pigment particles, the coating comprising at least one of an oxide, a phosphate, and a nitrate; and (iii) a coating disposed over each of the pigment particles, the coating comprising at least one of a polymer and an oligomer.

11 Claims, 2 Drawing Sheets

(51) Int. Cl.
| | |
|---|---|
| *C09C 1/36* | (2006.01) |
| *C09C 3/06* | (2006.01) |
| *C09D 11/033* | (2014.01) |
| *C09D 11/037* | (2014.01) |
| *C09D 11/10* | (2014.01) |
| *G03G 9/125* | (2006.01) |
| *G03G 9/13* | (2006.01) |
| *G03G 9/135* | (2006.01) |
| *C09C 3/10* | (2006.01) |
| *C09C 3/12* | (2006.01) |
| *C09D 11/107* | (2014.01) |
| *C09C 1/40* | (2006.01) |
| *C09C 3/08* | (2006.01) |
| *C09C 1/04* | (2006.01) |

(52) U.S. Cl.
CPC .......... *C09C 1/3661* (2013.01); *C09C 1/3676* (2013.01); *C09C 1/3684* (2013.01); *C09C 1/3692* (2013.01); *C09C 1/407* (2013.01); *C09C 3/063* (2013.01); *C09C 3/08* (2013.01); *C09C 3/10* (2013.01); *C09C 3/12* (2013.01); *C09D 11/033* (2013.01); *C09D 11/037* (2013.01); *C09D 11/10* (2013.01); *C09D 11/107* (2013.01); *G03G 9/125* (2013.01); *G03G 9/131* (2013.01); *G03G 9/132* (2013.01); *G03G 9/135* (2013.01); *G03G 9/1355* (2013.01); *C01P 2004/62* (2013.01); *C01P 2004/64* (2013.01); *C01P 2006/40* (2013.01)

(56) References Cited

U.S. PATENT DOCUMENTS

| | | |
|---|---|---|
| 5,346,796 A * | 9/1994 | Almog .................. G03G 9/135 430/114 |
| 5,501,732 A | 3/1996 | Niedenzu et al. |
| 6,548,039 B1 | 4/2003 | Duyvesteyn et al. |
| 6,783,586 B2 | 8/2004 | Bettler et al. |
| 8,323,625 B2 | 12/2012 | Nakamura et al. |
| 2008/0255281 A1 | 10/2008 | Lin et al. |
| 2013/0224650 A1* | 8/2013 | Oki ........................ G03G 9/122 430/115 |
| 2014/0045116 A1 | 2/2014 | Agur et al. |
| 2014/0234595 A1 | 8/2014 | Egami et al. |
| 2016/0370726 A1* | 12/2016 | Zhao .................... C09D 11/037 |

FOREIGN PATENT DOCUMENTS

| | | |
|---|---|---|
| WO | WO-2011/009488 | 1/2011 |
| WO | WO-2012/105951 | 8/2012 |
| WO | WO-2013/062530 | 5/2013 |
| WO | WO-2013/103346 | 7/2013 |
| WO | WO-2014/120119 | 8/2014 |

OTHER PUBLICATIONS

DuPont™ Ti-Pure® titanium dioxide, How to Select a Suitable Ti-Pure® Titanium Dioxide Grade, Retrieved Dec. 15, 2014, 4 Pages.

International Search Report and Written Opinion for International Application No. PCT/EP2014/079068 dated Feb. 25, 2015, 12 pages.

* cited by examiner

INK COMPOSITION WITH PIGMENT PARTICLES HAVING A HYDROPHOBIC SURFACE

BACKGROUND

One example of digital printing is electrophotographic printing. Liquid electrophotographic printing, or "LEP printing" is a specific type of electrophotographic printing, in which a liquid ink or "LEP ink," instead of a powder toner, is employed in the electrophotographic process.

BRIEF DESCRIPTION OF THE DRAWINGS

The drawings are provided to illustrate various examples of the subject matter described herein in this disclosure (hereafter "herein" for short, unless explicitly stated otherwise) related to a composition for 3D printing, particularly a thermally decomposing material for 3D printing, and are not intended to limit the scope of the subject matter. The drawings are not necessarily to scale.

DETAILED DESCRIPTION

Figure 1:
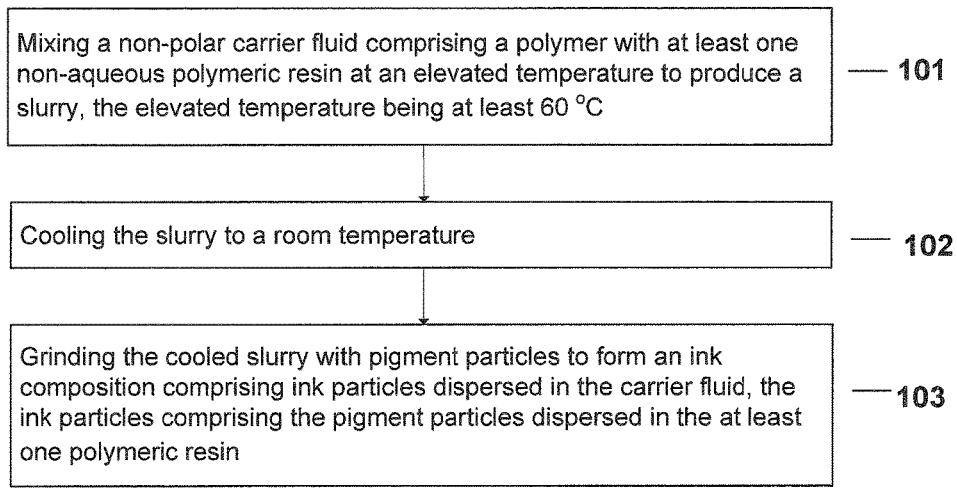
FIG. 1 is a schematic flow chart showing the processes involved in one example of a fabrication method of the ink composition described herein.

"Background development" refers to the phenomenon during a printing (e.g., LEP printing) process in which an amount of the pigment particles are not deposited at the pre-designated areas and instead are deposited in the background areas of the photoreceptor and final substrate. These loose pigment particles do not bind to the ink particles during the mixing process, and the background development may cause image degradation. In some instances, background ink particles may be also pigmented particles that are not charged correctly. Loose pigment particles may result in undercharging of the ink particles in the ink composition. In this case, the ink particles do not carry the charges needed for optimal transfer, thereby resulting in depositing on uncharged areas of the photoconductive layer, which in turn may also cause background development.

In view of the aforementioned challenges related to background development, the Inventors have recognized and appreciated the advantages of pigment particles with a modified surface. Following below are more detailed descriptions of various examples related to a liquid electrophotographic ink composition, particularly one with a pigment particles having a hydrophobic surface. The various examples described herein may be implemented in any of numerous ways.

Provided in one aspect of the examples is a liquid electrophotographic ink composition, comprising: a carrier fluid comprising a polymer; ink particles each comprising a non-aqueous polymeric resin and pigment particles distributed in the polymeric resin; and a charge director; wherein the pigment particles comprise a metal oxide and have a hydrophobic surface; and wherein the hydrophobic surface comprises at least one of the following: (i) nanoparticles attached to each of the pigment particles, the nanoparticles comprising at least one of an oxide, a phosphate, and a nitrate; (ii) a coating disposed over each of the pigment particles, the coating comprising at least one of an oxide, a phosphate, and a nitrate; and (iii) a coating disposed over each of the pigment particles, the coating comprising a at least one of a polymer and an oligomer.

Provided in another aspect of the examples is a liquid electrophotographic ink composition, comprising: a non-polar carrier fluid comprising a polymer; ink particles each comprising a non-aqueous polymeric resin and pigment particles distributed in the polymeric resin; and a charge director; wherein the pigment particles comprise titanium dioxide and have a hydrophobic surface; and the liquid electrophotographic ink composition has a particle conductivity of between about 100 pmho/cm$^2$ and about 300 pmho/cm$^2$.

Provided in another aspect of the examples is a method of making, comprising: mixing a non-polar carrier fluid comprising a polymer with at least one non-aqueous polymeric resin at an elevated temperature to produce a slurry, the elevated temperature being at least 60° C.; cooling the slurry to a room temperature; and grinding the cooled slurry with pigment particles to form an ink composition comprising ink particles dispersed in the carrier fluid, the ink particles comprising the pigment particles dispersed in the at least one polymeric resin; wherein the pigment particles comprise titanium dioxide and have a hydrophobic surface; and wherein the hydrophobic surface comprises at least one of the following: (i) nanoparticles attached to each of the pigment particles, the nanoparticles comprising at least one of an oxide, a phosphate, and a nitrate; (ii) a coating disposed over each of the pigment particles, the coating comprising at least one of an oxide, a phosphate, and a nitrate; and (iii) a coating disposed over each of the pigment particles, the coating comprising at least one of a polymer and an oligomer.

Ink Particles

The ink composition described herein may comprise any number of suitable constituents. For example, the ink composition may comprise ink particles (in some instances known as toner particles) and a carrier fluid in which the ink particles are dispersed. An ink particle may be a composite comprising a polymeric resin (in some instances known as a binder) and pigment particles. The ink composition may also comprise a charge director dispersed in the carrier fluid. The polymeric resin of the ink particles may facilitate the charge director to attach to the ink particles, thereby charging the ink particles.

One constituent of the ink composition described herein is ink particles. The ink particles may comprise pigment particles that may at least in part provide a color to the ink composition. In one example, a pigment is a colorant. The ink composition may have any color. In one example, the ink composition is white. The term "white," when referred to an ink composition, may refer to various shades of white, including, for example, a slight tint of a different color—e.g., white, ivory white, pearl white, etc.

In the ink particles, the pigment particles may be dispersed in a polymeric resin (binder). The pigment particles may be distributed in the polymeric resin homogeneously or inhomogeneously. The polymeric resin may encapsulate the pigment particles during the production of an LEP ink. The polymer resin may provide structural integrity for an ink film after printing. Depending on the application, the polymeric resin described herein may refer to any suitable polymeric resin, such as those described below.

The ink particles may have any suitable geometry. For example, the particles may be spherical, ellipsoidal, cubical, cylindrical, spiny, wire-like, sheet-like, flake-like, etc. The ink particles may have an irregular geometry. In one example, the ink particles described herein are spherical. The term "spherical" herein may encompass a shape that is a perfect sphere or almost spherical. The term "almost spherical" may refer to a shape that resembles a sphere but is not completely spherical, such as having a relatively small amount of irregularity deviating from a perfect spherical shape. Thus, a spherical particle herein may refer to a particle having a sphericity of at least about 0.80—e.g., at least about 0.85, about 0.90, about 0.95, or higher. The pigment particles within the ink particles may also have any suitable geometry, such as any of the geometries described herein for the ink particles. The pigment particles may have the same geometry as the ink particles, or they may have a different geometry from the ink particles.

The ink particles may have any suitable size. Depending on the geometry, the term "size" herein may refer to length, width, height, diameter, etc. Also, when referring to a plurality of objects, the value of any of the dimensions described herein may refer to a statistical average. In one example, the ink particles have an average diameter of between about 5 µm and about 80 µm—e.g., between about 10 µm and about 50 µm, between about 15 µm and about 40 µm, between about 20 µm and about 30 µm, etc.

The ink particles may be present in the ink composition at any suitable amount. For example, the ink particles may be present in the ink composition at between about 1 wt % and about 50 wt %—e.g., between about 2 wt % and about 40 wt %, between about 3 wt % and about 30 wt %, between about 4 wt % and about 20 wt %, between about 5 wt % and about 10 wt %, etc. Other content values are also possible. In one example, the ink particles present in the ink composition at between about 1 wt % and about 10 wt %—e.g., about 2 wt % and about 8 wt %, about 4 wt % and about 6 wt %, etc.

Pigment Particles

The pigment particles in the ink particles may have any suitable size. The size of the pigment particles generally is smaller than that of the ink particles. In one example wherein the ink particles comprise very little, such as no, polymeric resin, the size of the pigment particles is about the same as that of the ink particles. In one example, while the overall ink particles have the aforementioned average diameters, the pigment particles have an average diameter of between about 50 nm and about 600 nm—e.g., between about 100 nm and about 300 nm, between about 200 nm and about 250 nm, etc. Other diameter values are also possible.

The pigment particles may comprise any suitable material. The type of material employed may depend on, for example, the color intended for the pigment particles to provide. For example, the material may comprise at least one ceramic. The ceramic may be a metal oxide. The metal in the metal oxide may be, for example, a transition metal. The metal oxide may comprise at least one of titanium dioxide, aluminum oxide, and zinc oxide. In one example, the metal oxide comprises titanium dioxide. In one example, the metal oxide is titanium dioxide and the ink composition is white. In another example, the metal oxide comprises titanium dioxide and the ink composition is not white. Depending on the application, other types of materials, including other types of metal oxides, may be employed.

The ink particles provided herein may have any suitable level of pigment loading, depending on the application. The term "pigment loading" may refer to the average content of the pigment particles in the ink particles. The content may refer to volume percentage ("vol %") or weight percentage ("wt %"), depending on the context. In one example, the pigment loading refers to the average wt % of the pigment particles in the ink particles. In one example wherein the pigment particles comprise at least one metal oxide, the "pigment loading" with respect to each of the at least one metal oxide refers to the average wt % of each of the at least one metal oxide in the ink particles. In one example wherein the pigment particles comprise only one type of metal oxide, the pigment loading of the ink particles as a whole refers to the average wt % of this metal oxide in the ink particles. In one example, pigment loading refers to the average wt % of titanium dioxide in the ink particles. In one example, the pigment loading of a metal oxide in the ink particles is less than about 60 wt % of the ink particles, such as less than or equal to about 55 wt %—e.g., less than or equal to about 50 wt %, about 40 wt %, about 30 wt %, about 20 wt %, or lower. In one example, the pigment loading of a metal oxide in the ink particles is between about 8 wt % and about 55 wt %—e.g., between about 9 wt % and about 50 wt %, between about 10 wt % and about 40 wt %, between about 11 wt % and about 30 wt %, between about 12 wt % and about 20 wt %, etc. In one example, the pigment loading of a metal oxide in the ink particles is between about 12 wt % and about 18 wt %. In one example, the aforementioned pigment loading refers to that of a white ink composition. Other pigment loading values are also possible. For example, other pigment loading values may be employed for a different color of an ink composition.

The pigment particles described herein may be modified with respect to their structure to have certain properties. One example of a modified structure is a pigment particle with a modified surface property, such as surface chemistry, surface geometry, etc. The modification may involve, for example, changing the surface property of the pigment particles by attaching another material to the surface of the pigment particles. This material may be particulates, such as particles (e.g., nanoparticles), a coating layer, etc. The addition of this material to pigment particles may alter the surface of the pigment particles (including this material after it is attached) to have a certain pH, hydrophobicity, etc. The pigment particles described herein may have a surface property tailored towards having a certain chemical and/or physical interaction with the polymeric resin in the ink particles and/or the charge director in the ink composition. This interaction may influence pigment dispersion properties and electrical behavior, and incorporation of pigment particles into the ink particle. In general, well incorporation of pigment particles into ink particles may result in reduction of background development, and well dispersion of ink particle may provide improved opacity.

The pigment particles described herein may have a hydrophobic surface. The hydrophobic surface of the pigment particles may take at least one of the following forms: (i) nanoparticles comprising an inorganic material attached to each of the pigment particles; (ii) a coating comprising an inorganic material disposed over each of the pigment particles; and (iii) a coating comprising an organic material disposed over each of the pigment particles. It is noted that the surface of the pigment particles may comprise any combination of inorganic and organic materials, so long as the surface is hydrophobic.

The inorganic material of the nanoparticles in (i) and the coating in (ii) may comprise any suitable inorganic material. The inorganic material may comprise at least one of an oxide, a phosphate, and a nitrate. The oxide, phosphate, and nitrate may refer to a metal oxide, a metal phosphate, and metal nitrate, respectively. The oxide may be at least one of silica, alumina, zirconia, titanium dioxide, tin oxide, zinc oxide, and cerium oxide. In one example, the titanium dioxide is hydrous titanium dioxide.

The nanoparticles may be attached to surface of the pigment particles physically, chemically, or both. For example, the nanoparticles may be attached to the surface by a linking molecule. The nanoparticles may have any suitable geometry, such as any of those aforedescribed for the pigment particles. For example, the nanoparticles may be spherical. The nanoparticles may have the same or different geometry from the pigment particles. The nanoparticles may have any suitable size. For example, the nanoparticles may have an average particle size of between about 1 nm and about 1000 nm—e.g., between about 10 nm and about 800 nm, between about 50 nm and about 600 nm, between about 100 nm and about 400 nm, between about 200 nm and about 300 nm, etc. Other size values are also possible. The coating may cover at least a portion of the circumference of a pigment particle, such as the entire circumference of a pigment particle. The coating may have any suitable thickness. The thickness may for example be between about 1 nm and 1000 nm—e.g., between about 20 nm and about 800 nm, between about 50 nm and about 600 nm, between about 80 nm and about 400 nm, between about 100 nm and about 300 nm, etc. Other thickness values are also possible.

The organic material of the coating in (iii) may comprise any suitable organic material, such as a polymer, an oligomer, or both. For example, the organic material may be at least one of polyol, a polyamine, and a polysiloxane, or a salt of any of the foregoing. A polyol herein may refer to any suitable polymer molecule containing multiple hydroxyl functional groups—e.g., a molecule with two hydroxyl groups is a diol, one with three a triol, etc. Examples of a polyol include polyether, polyester, glycerin, pentaerythritol, polyethylene glycol, polypropylene glycol, poly(tetramethylene ether) glycol, hydroxyl-terminated polybutadiene, etc. A polyamine herein may refer to any suitable polymer molecule containing a basic nitrogen atom with a lone pair. The amine may contain an organic derivative, an inorganic derivative, or both. The amine may be an aliphatic amine or an aromatic amine. The amine may be primary, secondary, tertiary, or cyclic amine. A polysiloxane (in some instances known as "silicone") herein may refer to any suitable polymer molecule containing the element silicon together with elements carbon, hydrogen, oxygen, and sometimes others. The term "element" herein may refer to the chemical symbol found in a Periodic Table. The polysiloxane may be represented by the chemical formula [$R_2SiO$]$_n$, where n is a positive integer, and R is an organic group such as methyl, ethyl, or phenyl. For example, the polysiloxane may contain an inorganic silicon-oxygen backbone ( . . . —Si—O—Si—O—Si—O— . . . ) with organic side groups attached to the silicon atoms, which are four-coordinate. The polysiloxane —Si—O— may have any suitable chain length, side group, and level of crosslinking. The polysiloxane may be linear or branched. For example, the polysiloxane may be a silicone oil, such as polydimethylsiloxane ("PDMS") or a variation thereof (e.g., polyetherdimethylsiloxane). The polysiloxane may be a silicone resin that is formed by branched, cage-like oligosiloxanes, having a general formula of $R_nSiX_mO_y$, where n, m, and y are positive integer; R is a non-reactive substituent, usually Me or Ph; and X is a functional group H, OH, Cl or. In one example, the R here is a methyl functional group.

Not to be bound by any particular theory, but pigment surface treatment by attaching nanoparticles on the surface or coating the pigment particles at least partially that render the surface hydrophobic may act as anchoring points for the acid group of the polymeric resin binder and/or the charge director materials, both of which are described further below. Accordingly, in this instance, the modified hydrophobic surface may make the pigment particles more compatible with a binding resin (than does an unmodified surface) and improve the affinity of resultant ink particles to charge director molecules. This may result in improved dispersability (of pigments and ink particles) and the incorporation of pigment particles into ink particles in a non-polar carrier fluid. In one example, improvement in the dispersability and in the incorporation of pigment particles into ink particles leads to decreased background development in the printed ink composition.

The pigment particles with a modified surface described herein may be commercially available products. Examples of the pigment particle include Ti-Pure® R900 (available from DuPont Company, USA), SACHTLEBEN R405 (available from Sachtleben Chemie GmbH, Germany), Ti-Pure® R104 (available from DuPont Company, USA), and SACHTLEBEN R-405 (available from Sachtleben Chemie GmbH, Germany). Other products, including modified versions of any of the products listed herein, are also possible.

Polymeric Resins

The polymeric resin may act as a matrix in which the pigment particles are dispersed/distributed. The polymeric resin may be any suitable polymeric resin material or a mixture of different polymeric resin materials. The polymeric resin may refer to a synthetic polymeric resin or a natural polymeric resin. The polymer resin may comprise a thermoplastic polymer. The polymer resin may comprise a co-polymer. The polymeric resin may comprise copolymers of any suitable microstructure. The polymer resin may comprise a random copolymer. For example, the polymeric resin may comprise an ethylene-based polymeric resin. For example, the polymeric resin may comprise, or be, a random co-polymer comprising an ethylene. Examples of suitable ethylene-based polymeric resins include co-polymers of ethylene, methacrylic acid, and acrylic acid; co-polymers of ethylene and an acrylate; co-polymers of ethylene and vinyl acetate; or various combinations of these co-polymers. When co-polymers of ethylene and an acrylate are employed, the acrylate may be a butyl-acrylate, an ethyl-acrylate, a methyl-acrylate, or various combinations thereof. Some commercially available examples of co-polymers of ethylene and an acrylate include ELVALOY® AC resins by DuPont Company, USA. Some commercially available examples of co-polymers of ethylene and vinyl acetate include ELVAX® resins and BYNEL® resins from DuPont Company, USA.

The polymeric resin may comprise copolymers of any suitable material chemistry. In one example, the polymeric resin includes ethylene acid copolymers; ethylene acrylic acid copolymers; methacrylic acid copolymers; ethylene vinyl acetate copolymers; copolymers of ethylene acid and alkyls, acrylic acid and alkyls, methacrylic acid and alkyls (with carbon chain lengths between 1 and 20 carbons, inclusive); esters of methacrylic acid or acrylic acid; polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g., copolymer of acrylic or methacrylic acid and at least one alkyl ester of acrylic or methacrylic acid where the alkyl is from 1 to about 20 carbon atoms, such as methyl methacrylate or ethylhexylacrylate); ethylene-acrylate terpolymers; ethylene-acrylic esters; maleic anhydride ("MAH") or glycidyl methacrylate ("GMA") terpolymers; low molecular weight ethylene-acrylic acid ionomers (i.e., those having a molecular weight of less than 1000 amu); or combinations thereof. In one example, the polymer resin comprises at least one of the NUCREL® or BYNEL® family of polymers (available from DuPont Company, Wilmington, Del., USA)—e.g., NUCREL® 403, NUCREL® 407, NUCREL® 609HS, NUCREL® 908HS, NUCREL® 1202HC, NUCREL® 30707, NUCREL® 1214, NUCREL® 903, NUCREL® 3990, NUCREL® 910, NUCREL® 925, NUCREL® 609, NUCREL® 599, NUCREL® 699, NUCREL® 960, NUCREL® RX 76, NUCREL® 2806; BYNEL® 2002, BYNEL® 2014, or BYNEL® 2020; the ACLYN® family of polymers (available from Honeywell International, Inc., Morristown, N.J., USA)—e.g., ACLYN® 201, ACLYN® 246, ACLYN® 285, or ACLYN® 295; or the LOTADER® family of polymers (available from Arkema, Inc., King of Prussia, Pa., USA)—e.g., LOTADER® 2210, LOTADER® 3430, or LOTADER® 8200. Another example of suitable polymeric resins is A-C® family of resins, such as A-C® 5120, available from Honeywell, USA. The polymeric resin may have at least one functional group, such as carboxylic acid, ester, amide, amine, urea, anhydride, aromatic, or halogen based groups. Any of the polymeric resins described herein may be used alone or in combination.

The polymeric resin may be of any content value in the ink particles, depending on the application. For example, the polymeric resin may be greater than about 40 wt % of the ink particles, such as greater than or equal to about 45 wt %—e.g., greater than or equal to about 50 wt %, about 60 wt %, about 70 wt %, about 80 wt %, or higher.

Charge Director

To be employed in an LEP application, the ink particles may be charged, for example, before the particles are incorporated into a toner. The charging may involve using at least one charge director. The charge director may also be employed in an LEP ink to prevent undesirable aggregation of the ink particles in a carrier fluid. The charge director may be a natural charge director ("NCD"). For example, the charge director may be a basic charge director, an acidic charge director, or a neutral charge director. The term "charge director" may refer to a material that, when employed, facilitates charging of the ink particles, thereby enhancing the electrophoretic mobility of the ink particles during an LEP. In one example, the charge director is basic, which basic charge director may react with an acid-modified ink particle to charge negatively the particle. In other words, the charging of the particle may be accomplished using an acid-base reaction (or interaction) between the charge director and the acid-modified particle surface. In another example, the charge director is acidic, which acidic charge director may react (or interact) with the base-modified ink particle to charge positively the particle. The charging of the pigment particle may be accomplished via an acid-base reaction (or interaction) between the charge director and the base-modified particle surface. In example, the charge director is an overall neutral charge director, having an overall net charge of zero.

The charge director may comprise small molecules or polymers that are capable of forming reverse micelles in a non-polar carrier fluid. Such a charge director may be colorless and may tend to be dispersible or soluble in the carrier fluid. The charge director may comprise a neutral and non-dissociable monomer or polymer, such as, for example, a polyisobutylene succinimide amine, which in one example has a molecular structure as follows:

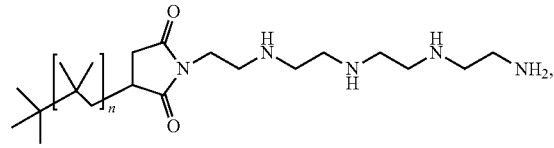

where "n" is an integer ranging from 15 to 100.

Another example of a charge director includes an ionizable molecule that is capable of disassociating to form charges. Examples of such a charge director include a metal salt of dialkyl sulfosuccinate, sodium di-2-ethylhexylsulfosuccinate or dioctyl sulfosuccinate. In one example, the molecular structure of dioctyl sulfosuccinate is as follows:

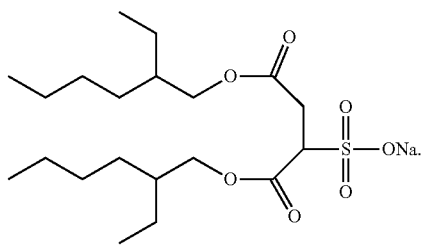

The charge director may be a commercially available product. For example, the charge director may be an HP Imaging Agent (of the HP Imaging Agent series) commercially available from Hewlett-Packard Company. The charge director may comprise a sulfosuccinate-containing molecule. For example, the charge director may comprise (a) nanoparticles of a simple salt; and (b) a sulfosuccinate salt of the general formula $MA_n$, wherein M is a metal, n is the valence of M, and A is an ion of the general formula (I): $[R_1—O—C(O)CH_2CH(SO_3)C(O)—O—R_2]$, wherein each of $R_1$ and $R_2$ is an alkyl group. In this example, the charge director material is substantially free of acids of the general formula (I), wherein one or both of $R_1$ and $R_2$ is hydrogen, and if only one of them is hydrogen, the other is an alkyl group. The charge director may comprise (a) nanoparticles of a simple salt; (b) a first micelle forming substance, being sulfosuccinate salt of the general formula $MA_R$, wherein M is a metal, n is the valence of M, and A is an ion of the general formula (I): $[R_1—O—C(O)CH_2CH(SO_3)C(O)—O—R_2]$, wherein each of $R_1$ and $R_2$ is an alkyl group; and (c) a second micelle forming substance. The aforementioned simple salt may comprise a cation that is $Mg^{+2}$, $Ca^{+2}$, $Ba^{+2}$, $NH_4^+$, tert-butyl ammonium, $Li^+$, and $Al^{+3}$, or from any sub-group thereof. The aforementioned simple salt may comprise an anion that is $SO_4^{-2}$, $PO_4^{-3}$, $NO_3—$, $HPO_4^{-2}$, $CO_3^{-2}$, acetate, trifluoroacetate (TFA), $Cl^-$, $Br^-$, $I^-$, $ClO_4^-$, and $TiO_3^{-4}$, or from any sub-group thereof. For example, the salt may comprise $CaCO_3$, $Ba_2TiO_3$, $Al_2(SO_4)_3$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, tert-butyl ammonium bromide, $NH_4NO_3$, LiTFA, $Al_2(SO_4)_3$, $LiClO_4$ and $LiBF_4$, or any sub-group thereof.

Another example of a charge director includes a zwitterion charge director such as, for example, lecithin (e.g., soya lecithin). The molecular structure of lecithin is shown as follows:

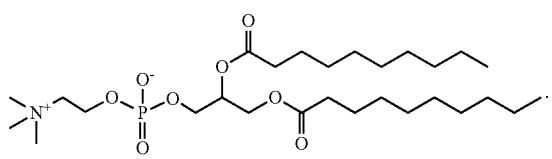 [SMILES: CCCCCCCCCC(=O)OCC(COP(=O)([O-])OCC[N+](C)(C)C)OC(=O)CCCCCCCCC]

Other suitable charge directors may also be employed.

Another example of a charge director is a sulfonate salt. The sulfonate salt may be, for example, a barium sulfonate salt, such as basic barium petronate ("BBP"). In one example, basic barium petronate is a barium sulfonate salt of a 21-26 hydrocarbon alkyl. The sulfonate salt may be an amine salt, such as an isopropyl amine sulfonate salt (which is also a sulfonate salt). In one example, isopropyl amine sulfonate salt is dodecyl benzene sulfonic acid isopropyl amine.

The aforedescribed charge directors may be employed in any combination. For example, a combination of lecithin, barium sulfonate salt, and isopropyl amine sulfonate salt may be used. The charge director(s) may be present in the ink composition at any suitable amount. For example, the charge director may be present in an amount of at least about 1 mg of charge director per gram of solids of the electrostatic ink composition (which will be abbreviated to mg/g)—e.g., at least about 2 mg/g, about 5 mg/g, about 10 mg/g, about 15 mg/g, about 20 mg/g, about 25 mg/g, about 50 mg/g, about 60 mg/g, about 80 mg/g, about 100 mg/g, or more. Other values are also possible.

Carrier Fluid

One constituent of the ink composition described herein may be a carrier fluid. The term "carrier fluid" may refer to a fluid in which the ink particles are dispersed to form an ink dispersion. In one example, the carrier fluid acts as a dispersing medium for the other constituents, such as the ink particles, in an ink composition. A carrier fluid may be formulated for electrophotographic printing such that the electrophotographic ink has a viscosity and conductivity suitable for such printing. The carrier fluid may be non-polar and substantially non-aqueous—e.g., containing less than 0.5 weight % (wt %) water. In another example, the hydrocarbon may be non-aqueous—i.e. containing no water. The carrier fluid may include at least one additive, such as surfactants, organic solvents, charge control agents, charge directors, viscosity modifiers, stabilizing agents, anti-kogation agents, etc.

The carrier fluid may comprise, or be, a non-polar carrier. The carrier fluid may have the same composition as that of any of the polymeric resins described above. The non-polar carrier of the carrier fluid may be the same non-polar carrier employed throughout the process of forming an ink slurry and/or the final ink composition. The carrier fluid may have a different composition from that of the polymeric resin. A non-polar fluid may refer to a fluid that has properties such as low odor, lack of color, selective solvency, oxidation stability, low electrical conductivity, low surface tension, desirable wetting, spreadability, low viscosity, narrow boiling point range, non-corrosive to metals, low freezing point, high electrical resistivity, high interfacial tension, low latent heat of vaporization, and low photochemical reactivity. Examples of non-polar carriers include dielectric liquids, non-oxidative water immiscible liquids (e.g., petroleum distillates), hydrocarbon-based carriers (e.g., aliphatic (i.e., linear/acyclic or cyclic) hydrocarbons, branched-chain aliphatic hydrocarbons, etc.), silicone oil, soy bean oil, vegetable oil, plant extracts, etc. In one example, the non-polar carrier is an alkane or a cycloalkane having from 6 to 14 carbon atoms (e.g., n-hexanes, heptanes, octane, dodecane, cyclohexane etc.), t-butylbenzene, 2,2,4-trimethylpentane, or combinations thereof. Examples of a non-polar carrier fluid include at least one substituted or unsubstituted hydrocarbon. The hydrocarbon may be linear, cyclic, or branched, and may be substituted with any suitable functional group. Examples of such hydrocarbons include any of dielectric liquids, non-oxidative water immiscible liquids, paraffins, isoparaffins, and oils. Examples of paraffins and isoparaffins include those in the ISOPAR® family (Exxon Mobil Corporation, Fairfax, Va., USA), including, for example, ISOPAR®-G, ISOPAR®-H, ISOPAR®-K, ISOPAR®-L, or ISOPAR®-M. In other examples, other hydrocarbons that may be used as the non-polar carrier fluid include those in the SOLTROL® family (available from Chevron Phillips Chemical Company, The Woodlands, Tex., USA) or SHELLSOL® (available from Shell Chemicals, Eschborn, Del., USA).

In one example, the non-polar carrier fluid includes any of linear, branched, and cyclic alkanes having from about 6 to about 100 carbon atoms, inclusive; hydrocarbons having from 6 to 14 carbon atoms, inclusive; cycloalkanes having from 6 to 14 carbon atoms, inclusive (e.g., n-hexanes, heptanes, octane, dodecane, cyclohexane, etc.); t-butylbenzene; 2,2,4-trimethylpentane; isoparaffinic hydrocarbons; paraffinic hydrocarbons; aliphatic hydrocarbons; de-aromatized hydrocarbons; halogenated hydrocarbons; cyclic hydrocarbons; functionalized hydrocarbons; or combinations thereof. The hydrocarbon may include oils, examples of which may include, silicone oil, soy bean oil, vegetable oil, plant extracts, or combinations thereof. The hydrocarbon included in the non-polar carrier fluid may be substantially non-aqueous—i.e., comprising less than about 1 wt % water—e.g., less than about 0.5 wt %, about 0.2 wt %, or lower. In one example, the hydrocarbon comprises no water. Any of the carrier fluids described herein may be used alone or in combination.

Ink Composition

The liquid ink composition described herein may comprise any suitable combination of the aforedescribed constituents. In one example, the ink composition may comprise pigment particles comprising titanium dioxide and having a hydrophobic surface. In one example, the hydrophobic surface is a result of having nanoparticles comprising alumina attached to the surface of the pigment particles and/or a polymer comprising a polydimethylsiloxane or a polyetherdimethylsiloxane coating the pigment particles. In this example, the ink composition comprises a non-aqueous polymeric resin (such as any of those described above) encapsulating the pigment particles, such as random co-polymer comprising an ethylene, and a non-polar carrier fluid comprising paraffins and/or isoparaffins. The ink composition may also comprise charge directors comprising at least one of lecithin, barium sulfonate salt, and isopropyl amine sulfonate salt. Other combinations of constituents are also possible.

At least as a result of the aforedescribed constituents, the ink composition described herein may have a number of desirable material properties. For example, the ink composition described herein may have a relatively high particle conductivity, in comparison to ink composition with pigment particles otherwise without the surface treatment as in the case of the pigment particles described herein. The particle conductivity may be measured by any suitable techniques. For example, the particle conductivity may be calculated using low field conductivity and high field conductivity of the particles. In one example, the low field conductivity is related to (e.g., proportional) to charge director amount. In one example, the high field conductivity is related to the total conductivity that discharges the dynamic imaging plate ("PIP"). In one example, the particle conductivity is related to the product of particle concentration, particle charge, and particle mobility.

The ink composition described herein may have a particle conductivity of at least about 50 pmho/cm$^2$—at least about 80 pmho/cm$^2$, about 100 pmho/cm$^2$, about 120 pmho/cm$^2$, about 140 pmho/cm$^2$, about 160 pmho/cm$^2$, about 180 pmho/cm$^2$, about 200 pmho/cm$^2$, about 220 pmho/cm$^2$, about 240 pmho/cm$^2$, about 260 pmho/cm$^2$, about 280 pmho/cm$^2$, about 300 pmho/cm$^2$, or higher. Other values are also possible. In one example, the particle conductivity is between about 50 pmho/cm$^2$ and about 1000 pmho/cm$^2$—e.g., between about 100 pmho/cm$^2$ and about 800 pmho/cm$^2$, between about 140 pmho/cm$^2$ and about 500 pmho/cm$^2$, between about 180 pmho/cm$^2$ and about 400 pmho/cm$^2$, between about 200 pmho/cm$^2$ and about 300 pmho/cm$^2$, between about 220 pmho/cm$^2$ and about 250 pmho/cm$^2$, etc. In one example, the particle conductivity is between about 100 pmho/cm$^2$ and about 300 pmho/cm$^2$ The ink composition described herein may be employed for any suitable type of printing. For example, the printing may be electrophotographic printing. Thus, in one example, the ink composition described herein is an electrophotographic ink composition. The term "electrophotographic printing" may refer to the process of transferring an image from a photo imaging substrate either directly or indirectly via an intermediate transfer member. The term "electrophotographic printers" may refer to the printers capable of performing electrophotographic printing. The ink composition may be a liquid suspension of ink particles. The ink composition may be a non-aqueous liquid. In one example, "liquid electrophotographic printing" (or "LEP printing") is a specific type of electrophotographic printing in which a liquid ink (or LEP ink) is employed in the electrophotographic process, rather than a powder toner. In another example, the ink composition comprises, or is, Electroink® (commercially available from Hewlett-Packard Company).

Electrophotographic printing techniques may involve the formation of a latent image on a photoconductor surface mounted on an imaging plate. In some examples, the photoconductor may first be sensitized to light, in one example through charging with a corona discharge, and then may be exposed to light projected through a positive film of the document to be reproduced. This may result in dissipation of the charge in the exposed areas and the formation of a latent image on the photoconductor. The latent image may subsequently be developed into a full image by the attraction of oppositely charged toner particles to the charge remaining on the unexposed areas. Next, the developed image may be transferred from the photoconductor to the blanket, which in one example is a fabric-reinforced sheet of rubber or polymer wrapped around a cylinder which may receive the toner from the photoconductor before it is transferred to the substrate. From the blanket, the image may be transferred to organic or inorganic substrates, such as paper, plastic or other suitable materials, by heat, pressure, a combination thereof, or any other suitable method, to produce the printed final image.

Making/Using the Ink Composition

The ink composition described herein may be fabricated by a method involving any suitable process, depending on the application and the materials involved. Similarly, the ink composition described herein may be employed in any suitable application, such as any of the printing processes described herein.

The ink composition may be fabricated by combining at least ink particles, such as any of those described herein, a charge director, such as any of those described herein, and at least a carrier fluid, such as any of those described herein. Depending on the application, the ink composition may be fabricated by incorporating additional constituents, such as at least one additive, including, for example, surfactants, organic solvents, charge control agents, viscosity modifiers, stabilizing agents, and anti-kogation agents. In one example, the additives include at least one of charge control agents, dispersants, plasticizers, polymers, resins, theology modifiers, salts, stabilizers, surfactants, UV curable materials, viscosity modifiers, and surface-active agents. The additives may be present at between about 0 wt % and about 10 wt % of the ink composition; other values are also possible.

The fabrication method may comprise mixing a carrier fluid comprising a polymer with at least one polymeric resin at an elevated temperature to produce a slurry; cooling the slurry' and grinding the cooled slurry with pigment particles to form an ink composition. The carried fluid, the polymer resin, the pigment particles, and the ink composition may be any of those described above. The elevated temperature may be any suitable temperature, depending on the material(s) involved. For example, the elevated temperature may be above room temperature—e.g., at least about 40° C., about 60° C., about 80° C., about 100° C., about 120° C., about 140° C., about 160° C., about 180° C., about 200° C., about 250° C., or higher. Other temperatures are also possible.

FIG. 1 is flowchart showing the processes involved in one example of a method of fabricating an ink composition described herein. The method may comprise mixing a non-polar carrier fluid comprising a polymer with at least one non-aqueous polymeric resin at an elevated temperature to produce a slurry, the elevated temperature being at least 60° C. (101). The method may further comprise cooling the slurry to a room temperature (102). Subsequently, the method may further comprise grinding the cooled slurry with pigment particles to form an ink composition comprising ink particles dispersed in the carrier fluid, the ink particles comprising the pigment particles dispersed in the at least one polymeric resin (103).

Additional processes may be employed. For example, the method may further comprise adding additional amount of a carrier fluid to adjust the concentration of the ink particles so that the ink particles are present in the ink composition at a desirable content value, such as those described above. For example, the process of fabricating the ink composition may comprise making any of the ink composition constituents, including the ink particles, such as any of the ink particles described herein. In one example, the method of making the ink particles comprises extruding the raw materials to form an extrudant, cooling the extrudant, and forming the cooled extrudant to form the ink particles.

The raw materials may comprise any suitable material that may be employed to make the ink particles. For example, the raw materials may comprise at least one ceramic. The ceramic may be a composite. The ceramic may comprise at least one metal oxide, such as any of the metal oxides described herein. In one example, the at least one metal oxide comprises titanium dioxide. In another example, the at least one metal oxide comprises multiple types of metal oxides, including at least one of titanium dioxide, aluminum oxide, and zinc oxide. The raw materials may comprise at least one polymeric resin, such as any of the polymeric resins described herein. In one example, the polymeric resin comprises a mixture of a polyethylene acrylic acid resin and polyethylene methacrylic acid resin. The raw materials may comprise at least one charge director, such as any of the charge directors described herein. In one example, the charge director is a natural charge director.

The polymeric resin mixture may be melted before the addition of the metal oxide into the molten resin mixture to form an extrudant; or the resin may be melted together with (i.e., in the presence of) the metal oxide. In one example, at least one polymer resin is melted before the at least one metal oxide is incorporated into the molten resin.

Depending on the application, including the materials involved, the extrusion may involve any extrusion suitable for a polymeric material. For example, the extrusion may involve a plastic/polymer extrusion. The extrusion may be, for example, hot extrusion, warm extrusion, cold extrusion, etc. The extrusion may be, for example, blown film extrusion, sheet/film extrusion, tubing extrusion, over-jacketing extrusion, co-extrusion, etc. Depending on at least the materials involved, the extrusion may involve any suitable processing conditions, including rotation speed and temperature. For example, the extrusion may involve a rotation speed of at least about 50 rpm—e.g., at least about 100 rpm, about 150 rpm, about 200 rpm, about 250 rpm, about 300 rpm, or more. Other values are also possible. For example, the extrusion may involve an extrusion temperature of at least about 60° C.—e.g., at least about 80° C., about 100° C., about 120° C., about 140° C., about 160° C., about 180° C., about 200° C., or higher. Other values are also possible. The temperature profile of the extrusion condition may comprise a temperature profile varying with time, such as a ramp up and/or down profile.

The extrudant may be cooled to allow for further processing. The cooling may involve any suitable process to lower the temperature of the extrudant from one temperature to another lower temperature. The lower temperature may be any suitable temperature, such as room temperature. For example, the cooling may involve a bath, such as a water bath. After the extrudant is cooled, the cooled extrudant may undergo additional processing, including reducing the size of the extrudant. The size reduction may involve any suitable process. For example, the cooled extrudant may be formed into pellets. The pellets may have any geometry. In one example, the pellets are cylindrical. In one example, the pellets have an average diameter of about 0.5 mm and about 10 mm—e.g., about 1 mm and about 8 mm, about 2 mm and about 6 mm, about 3 mm and about 4 mm, etc. In one example, the pellets have an average length of about 0.1 mm and about 2 mm—e.g., about 0.2 mm and about 1.6 mm, about 0.4 mm and about 1.2 mm, about 0.6 mm and about 0.8 mm, etc. Other average diameter and length values are also possible.

The pellets may be further processed, such as to further reduce the size thereof. This further size reduction may involve any suitable process, depending on the application, such as the materials involved. Examples of the size reduction process may include at least one of grinding, precipitation, homogenization, microfluidization, and the like. The grinding may involve, for example, milling. The milling may be, for example, ball milling. Depending on the application, such as the materials involved, any suitable grinding condition may be employed to reduce the size of the pellets. In one example wherein milling is employed, the pellets are ground in a bead mill at a temperature that is above room temperature, such as at greater than or equal to about 40° C.—e.g., greater than or equal to about 50° C., about 60° C., about 70° C., about 80° C., about 90° C., about 100° C., or higher. Other temperature values are also possible. In one example wherein milling is employed, the pellets are ground in a bead mill for a period of less than or equal to about 20 hours—e.g., less than or equal to about 18 hours, about 16 hours, about 14 hours, about 12 hours, about 10 hours, about 8 hours, about 6 hours, or shorter. In one example, the milling time is between about 6 hours and about 14 hours—e.g., between about 8 hours and about 12 hours, etc. Other milling/grinding times are also possible. The resultant ground particles may be any of the aforedescribed ink particles. For example, these ink particles may be spherical, or almost spherical. These particles may have any of the diameters described herein for ink particles.

As described above, the ink particles fabricated may be combined with other constituents to form an ink composition. In one example, the ink particles are charged before being incorporated with other ink composition constituents (e.g., carrier fluid) into a toner. In another example, the ink particles are charged by being co-existing with at least one charger director in the ink composition. The ink composition may then be employed in a variety of applications. For example, the ink composition may be printed onto a substrate. Any suitable printing technique may be employed. For example, the printing may be digital printing. The digital printing may be, for example, LEP.

During the printing process, at least some of the ink particles may connect to one another as the liquid carrier fluid and/or the polymer resin of the ink particles dries up (or solidifies). The connection may take the form of the ink particles fused together to form particle clusters; the fusing is described further below. The printing conditions may vary depending on the printing process. For example, the printing process may involve digitally pressing the ink composition over a substrate. The digital pressing may be carried out at a temperature above room temperature to facilitate fusing of the ink particles and/or drying of the carrier fluid and/or polymeric resin (of the ink particles). In one example, the pressing temperature is greater than or equal to about 40° C.—e.g., greater than or equal to about 50° C., about 60° C., about 70° C., about 80° C., about 90° C., about 100° C., about 120° C., about 140° C., about 160° C., about 180° C., about 200° C., or higher. Other temperature values are also possible. During digital pressing, the carrier fluid dries up, and, as a result, the ink parties may be fused to create a three-dimensional structure, such as one of those described further below.

Printed Ink Composition

The ink composition described herein may be printed to form a printed ink composition. The printed ink composition may be in the form of a layer disposed over a substrate. The printing may refer to electrophotographic printing, such as LEP. The substrate may refer to any material suitable for an ink composition to be disposed upon, and the printed ink composition may be used to display a variety of forms and/or images, including text, graphics, characters, images, or photographs. A substrate may comprise vinyl media, cellulose-based paper media, various cloth materials, polymeric materials (examples of which include polyester white film or polyester transparent film), photopaper (examples of which include polyethylene or polypropylene extruded on one or both sides of paper), metals, ceramics, glass, or mixtures or composites thereof.

The printed ink layer may have any suitable thickness. In one example, the thickness is large enough to accommodate a sufficient number of cavities present in the printed ink composition for the printed ink composition to have a desirable opacity. For example, the layer comprising the printed composition may have a thickness that is greater than or equal to about 2 μm—e.g., greater than or equal to about 3 μm, about 4 μm, about 5 μm, about 6 μm, about 7 μm, about 8 μm, about 9 μm, about 10 μm, or larger. In one example, the layer thickness is between about 2 μm and about 6 μm—e.g., between 3 μm and about 5 μm, etc. The printed ink composition may have a different microstructure than does the ink composition before being printed. As described further below, the ink composition described herein may provide certain characteristics to the printed ink composition after printing.

For example, the printed ink composition may have a relative high optical density, in comparison to an ink composition having pigments particles otherwise without the modified surface as in the case of pigments described herein. The optical density of the material may be measured using any suitable techniques. In one example, the optical density ("OD") may be measured and calculated as:

OD=−log [(reflected light)/incident light)].

The optical density of the printed ink composition described herein may be at least about 0.30—e.g., at least about 0.32, about 0.34, about 0.36, about 0.38, about 0.40, about 0.45, or higher.

For example, the printed ink composition may have a relative low background (development), in comparison to an ink composition having pigments particles otherwise without the modified surface as in the case of pigments described herein. The background of the material may be measured using any suitable techniques. For example, the background is determined using the difference between the optical density of the material and that of a pre-established standard. The printed ink composition described herein may have a background of less than about 0.05—e.g., less than equal to about 0.04, about 0.03, about 0.02, about 0.01, or lower.

Due at least in part to the aforedescribed properties, the ink composition described herein have numerous beneficial properties, particularly when used in LEP. For example, the printed ink composition described herein may have a lower background and higher optical density than other types of ink composition having pigment particles not as modified as the pigments described herein. The ink composition described herein may also have higher particle conductivity than other types of ink composition having pigment particles not as modified as the pigments described herein. The reduction in background may be improve the print quality of the printed product (e.g., increasing the opacity thereof), and may be particularly beneficial when printing is performed on a transparent substrate. Additionally, the reduction in background development in the ink compositions described herein may improve the life span of the photoconductor and the printing blanket and/or reduce wasted ink.

Non-Limiting Working Example

Material and Methods

Seven samples were produced in this Example using the processes as described below. Specifically, each of the sample underwent a process of preparing a slurry of the carrier liquid and polymer particles, paste molten resins, and then a process of grinding. All seven samples have the same polymer resins and carrier fluid but different white titanium dioxide pigment particles. Table 1 provides the information about the pigment particles used in the seven samples. The alumina and silica refer to nanoparticles or coating layer attached to at least a portion of the pigment surface, as produced by the respective manufacturers. The organic treatment refers to an organic coating having a polymer and/or oligomer covering at least partially the surface of the pigment surface, as produced by the respective manufacturers.

During the process of preparing the slurry, in each sample a paste of molten polymeric resins was mixed with Isopar®-L (available from Exxon, USA). In the mixing device, the resins and the Isopar®-L were mixed at a temperature of about 120-160° C. The wt/wt ratio between the resins and Isopar®-L was about 10-40% resins and 60-90% Isopar®-L.

TABLE 1

Titanium Dioxide Pigment Particles

| | | | Pigment surface treatment | | | | |
| --- | --- | --- | --- | --- | --- | --- | --- |
| | | | Inorganic surface treatment | | | | |
| Pigment # | Pigment commercial names | Pigment Supplier | TiO2, wt %, min. | Alumina wt %, max. | Silica wt %, max | Organic treatment wt %, carbon | Surface hydrophilicity |
| 1 | Ti-Pure ®R 101 | DuPont | 97 | 1.7 | N/A | yes, 0.2 wt % carbon | Hydrophilic |
| 2 | K-2076 | Kronos Titan GmbH | 96.5 | Yes | Yes | Yes, 0.1 wt % carbon | Hydrophilic |
| 3 | SACHTLEBEN RDO | SACHTLEBEN Chemie GmbH | 95.5 | yes | N/A | yes, polyol | Hydrophilic |
| 4 | Ti-Pure ®R900 | DuPont | 94 | 4.3 | N/A | N/A | Hydrophobic |
| 5 | SACHTLEBEN R405 | SACHTLEBEN Chemie GmbH | 96 | 1.3 | 0.3 | yes 0.1 wt % carbon (in a modified silicone) | hydrophobic |
| 6 | Ti-Pure ®R-104 | DuPont | 97 | 1.7 | N/A | yes, 0.3 wt % carbon (in silicone) | Hydrophobic |
| 7 | SACHTLEBEN R-405 | SACHTLEBEN Chemie GmbH | 96 | 1.3 | 0.3 | yes, 0.1 wt % carbon (in a silicon) | Hydrophobic |

The carrier liquid Isopar®-L was compressed about 60%-85% by total weight. The resins employed in each sample was a non-aqueous mixture of Nucrel® 699 (from DuPont, USA), A-C® 5120 (available from Honeywell, USA), and Nucrel® 925 (from DuPont, USA). The weight ratio of Nucrel® 699 to A-C® 5120 is about 80:20. The total of Nucrel® 699 and Nucrel® 925 is about 10%-35 wt % and that of A-C® 5120 is about 5-30 wt % of the total weight of the white mixture.

These ingredients were mixed in a double-planetary mixer, a Ross mixer, for about 1.5 hours at temperature between about 120° C. and about 160° C. to produce a slurry of the carrier liquid and polymer particles plasticized by solvation of the liquid carrier. The mixing was then continued for about 1.5 hours, while the mixture cools down to room temperature.

During the process of grinding, a white electrostatic ink composition was produced using Attritor S1, by mixing the formulation as set out in Table 2. The aforedescribed slurry was then added to a one gallon Attritor (Union Process 01 Attritor) together with titanium dioxide pigment described in Table 1 at 60% by total weight of solids. The materials were ground at about 40° C. at 250 rpm for about 12 hours. The temperature was the reduced to 40° C., and the mixture was ground for another 10.5 hours. Upon completion of grinding step, the mixture in each sample comprises ink particles having an average diameter of under about 6 micrometers dispersed in a carrier liquid comprising Isopar®-L. In each sample, a small amount of cyan pigment additive by Toyo, USA was added. In some instances, additional carrier liquid were added in order to provide a liquid toner (of ink particles) with a desired concentration of solid toner particles—e.g., in this case 4.5%.

In each sample, a charge director (mixture) was added. The charge director was present in an amount of at least mg/g (of charge director per grams of solids of the electrostatic ink composition). The charge director mixture employed in this Example included a combination of lecithin and sulfonate salts.

TABLE 2

The formulation composition, are described below:
Formulation composition

| Materials | Weight [gram] |
|---|---|
| Resin molten paste; non-volatile solids 31.5% | 122.4 |
| White pigment | 184 |
| Pigment III: cyan Toyo | 0.01 |
| Isopar ®-L | 1394 |
| Total weight | 1700 |

Results

Figure 2:
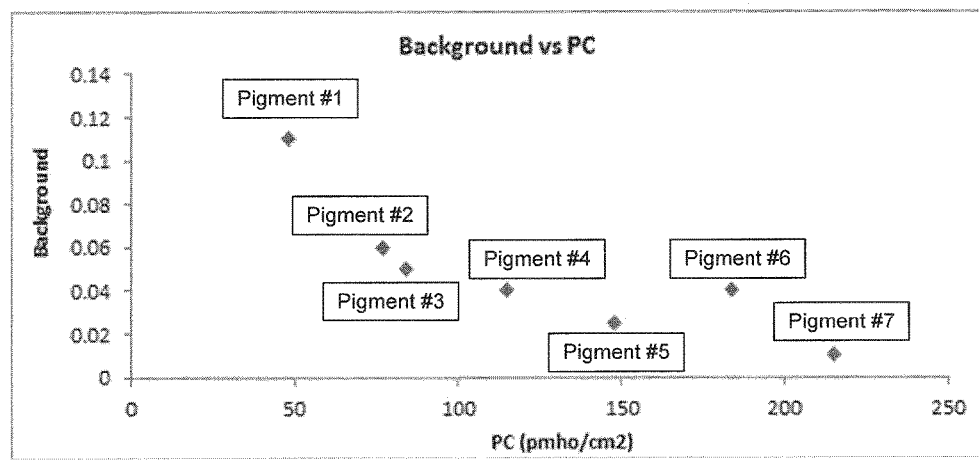
FIG. 2 shows, in one example, the background plotted against the particle conductivity ("PC") of several white ink compositions.
Figure 3:
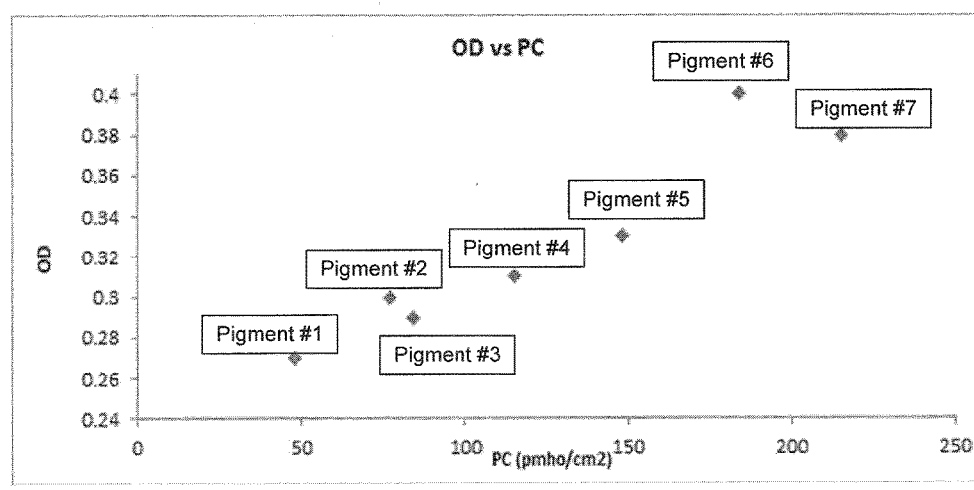
FIG. 3 shows, in one example, the optical density ("OD") plotted against the particle conductivity ("PC") of several white ink compositions.

Table 3 below shows the measured properties, including background (development), opacity, and particle conductivity, of each of the seven samples (labelled per the pigments used). FIG. 2 shows the results of the background development (delta OD) plotted against the particle conductivity of the seven samples (unit pmho/cm$^2$), and FIG. 3 shows the results of opacity plotted against the Particle conductivity of EI white ink (giving in pmho/cm$^2$).

TABLE 3

Background (development), opacity, and particle conductivity of each of the seven samples (labelled per the pigments used).

| Pigment # | Pigment surface treatment | Background (min) | OD | PC |
|---|---|---|---|---|
| 1 | Hydrophilic | 0.11 | 0.27 | 48 |
| 2 | Hydrophilic | 0.06 | 0.3 | 77 |
| 3 | Hydrophilic | 0.05 | 0.29 | 84 |
| 4 | Hydrophobic | 0.04 | 0.31 | 115 |
| 5 | Hydrophobic | 0.025 | 0.33 | 148 |
| 6 | Hydrophobic | 0.04 | 0.4 | 184 |
| 7 | Hydrophobic | 0.01 | 0.38 | 215 |

It is observed that pigment particles with a hydrophobic surface resulted in ink compositions having more desirable properties than those having a hydrophilic surface. Specifically, Pigments #4-#7 have lower background, higher optical density, and higher particle conductivity than Pigments #1-#3. Not to be bound any particularly theory, but it was believed that the hydrophobic surface treatments on the pigment surface in Pigments #4-#7 by deposition of nanoparticles of alumina on the surface or and coating the pigment surface with polydimethylsiloxanes or polyetherdimethylsiloxane (as examples of silicone and modified silicone, respectively), would act as anchoring points for acid group of the binder, and act as well as anchoring points for charge director materials. As a result, the pigment particles were more compatible with a binding resin and charge director molecules to allow and improve dispersability of the pigment particle in the non-polar carrier fluid. The improvement in dispersability and the incorporation of pigment into ink particles led to decreasing background development.

Additional Notes

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The indefinite articles "a" and "an," as used herein in this disclosure, including the claims, unless clearly indicated to the contrary, should be understood to mean "at least one." Any ranges cited herein are inclusive.

The terms "substantially" and "about" used throughout this disclosure are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Concentrations, amounts, and other numerical data may be expressed or presented herein in a range format. Such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "1 weight % (wt %) to 5 wt %" should be interpreted to include not only the explicitly recited values of 1 wt % to 5 wt %, but also include individual values and sub-ranges within the indicated range. Thus, included in this numerical range are individual values, such as 2, 3.5, and 4, and sub-ranges, such as from 1-3, from 2-4, and from 3-5, etc. This same principle applies to ranges reciting only one numerical value. Furthermore, such an interpretation should apply regardless of the breadth of the range or the characteristics being described.

In this disclosure, including the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, § 2111.03.

What is claimed:

1. A liquid electrophotographic ink composition, comprising:
    a carrier fluid comprising a polymer;
    ink particles each comprising a non-aqueous polymeric resin and pigment particles distributed in the polymeric resin; and
    a charge director;
    wherein the pigment particles comprise a metal oxide and have a hydrophobic surface; and
    wherein the hydrophobic surface comprises at least one of the following:
        (i) nanoparticles attached to each of the pigment particles, the nanoparticles comprising at least one of a phosphate, and a nitrate;
        (ii) a coating disposed over each of the pigment particles, the coating comprising at least one of a phosphate, and a nitrate; and
        (iii) a coating disposed over each of the pigment particles, the coating comprising at least one of a polyol, and a polyamine, or a salt thereof.

2. The liquid electrophotographic ink composition of claim 1, wherein the metal oxide comprises titanium dioxide.

3. The liquid electrophotographic ink composition of claim 1, wherein the liquid electrophotographic ink composition has a particle conductivity of between about 100 pmho/cm$^2$ and about 300 pmho/cm$^2$.

4. The liquid electrophotographic ink composition of claim 1, wherein the polymeric resin comprises a random co-polymer comprising an ethylene.

5. The liquid electrophotographic ink composition of claim 1, wherein the carrier fluid comprises a non-polar fluid.

6. The liquid electrophotographic ink composition of claim 1, wherein the charge director comprises at least one of a lecithin and a sulfonate salt.

7. An article, comprising a printed liquid electrophotographic ink composition of claim 1, wherein the printed ink composition has a background of less than about 0.05.

8. An article, comprising a printed liquid electrophotographic ink composition of claim 1, wherein the printed ink composition has an optical density of at least about 0.3.

9. A method of making, comprising:
    mixing a non-polar carrier fluid comprising a polymer with at least one non-aqueous polymeric resin at an elevated temperature to produce a slurry, the elevated temperature being at least 60° C.;
    cooling the slurry to a room temperature; and
    grinding the cooled slurry with pigment particles to form an ink composition comprising ink particles dispersed in the carrier fluid, the ink particles comprising the pigment particles dispersed in the at least one polymeric resin;
    wherein the pigment particles comprise titanium dioxide and have a hydrophobic surface; and
    wherein the hydrophobic surface comprises at least one of the following:
        (i) nanoparticles attached to each of the pigment particles, the nanoparticles comprising at least one of a phosphate, and a nitrate;
        (ii) a coating disposed over each of the pigment particles, the coating comprising at least one of a phosphate, and a nitrate; and
        (iii) a coating disposed over each of the pigment particles, the coating comprising at least one of a polyol, and a polyamine, or a salt thereof.

10. The method of claim 9, further comprising adding to the ink composition an additional amount of the non-polar carrier fluid, such that the ink particles are between 4 wt % and about 6 wt % of the ink composition.

11. The liquid electrophotographic ink composition of claim 1, wherein the metal oxide comprises at least one of aluminum oxide, and zinc oxide.

* * * * *

UNITED STATES PATENT AND TRADEMARK OFFICE
CERTIFICATE OF CORRECTION

PATENT NO. : 10,394,153 B2  
APPLICATION NO. : 15/534412  
DATED : August 27, 2019  
INVENTOR(S) : Emad Masoud et al.

Page 1 of 1

It is certified that error appears in the above-identified patent and that said Letters Patent is hereby corrected as shown below:

On the Title Page

In Column 1, item (73), Assignee, Line 1, delete "Amselveen (NL)" and insert -- Amstelveen (NL) --, therefor.

Signed and Sealed this  
Thirty-first Day of December, 2019

Andrei Iancu  
*Director of the United States Patent and Trademark Office*